US012478855B1

(12) United States Patent
Newman et al.

(10) Patent No.: US 12,478,855 B1
(45) Date of Patent: Nov. 25, 2025

(54) KINEMATIC RECOMMENDATION ACROSS DEVICES USING MACHINE LEARNING

(71) Applicant: Immersive IP Management, LLC, Chicago, IL (US)

(72) Inventors: Derek T Newman, Chicago, IL (US); Brian W. Coffman, Chicago, IL (US)

(73) Assignee: Immersive IP Management, LLC, Chicago, IL (US)

( * ) Notice: Subject to any disclaimer, the term of this patent is extended or adjusted under 35 U.S.C. 154(b) by 0 days.

(21) Appl. No.: 19/091,683

(22) Filed: Mar. 26, 2025

(51) Int. Cl.
*A63B 71/06* (2006.01)
*G06F 40/20* (2020.01)
*A63B 102/32* (2015.01)

(52) U.S. Cl.
CPC .......... *A63B 71/0622* (2013.01); *G06F 40/20* (2020.01); *A63B 2071/063* (2013.01); *A63B 2071/0638* (2013.01); *A63B 2071/0666* (2013.01); *A63B 2102/32* (2015.10); *A63B 2220/12* (2013.01); *A63B 2230/655* (2013.01)

(58) Field of Classification Search
CPC ................. A63B 2102/32; A63B 71/0622
USPC ........................................................ 434/247
See application file for complete search history.

(56) References Cited

U.S. PATENT DOCUMENTS

| 11,854,421 B2 * | 12/2023 | Doherty ................. A63B 69/36 |
| 2009/0210078 A1 * | 8/2009 | Crowley ................ G06Q 30/02 700/91 |
| 2022/0161121 A1 * | 5/2022 | Syed .................. A63B 71/0622 |
| 2024/0087367 A1 * | 3/2024 | Menaker .............. G06V 10/764 |
| 2024/0325847 A1 | 10/2024 | Peterson et al. |

FOREIGN PATENT DOCUMENTS

WO    WO-2012138528 A2 * 10/2012 ......... A63B 37/0003

\* cited by examiner

*Primary Examiner* — Dmitry Suhol
*Assistant Examiner* — Alyssa N Brandley
(74) *Attorney, Agent, or Firm* — Duane Morris LLP

(57) ABSTRACT

A system preparing kinematic recommendations for athletes using artificial intelligence is disclosed. The system is programmed to sense personal physical data regarding a subject athlete, and optionally review environmental data, and historical performance and physical data related to the subject athlete. The system produces performance recommendations for that subject athlete, determines a best medium for providing the performance recommendations to the subject athlete based on their personal physical data, and provides the performance recommendations to the subject athlete via that determined best medium. The best medium can include an augmented reality interface worn by the athlete. The performance recommendations can be prepared by machine learning or artificial intelligence models designed to analyze athletic performances, and to communicate conversationally with the athlete.

20 Claims, 6 Drawing Sheets

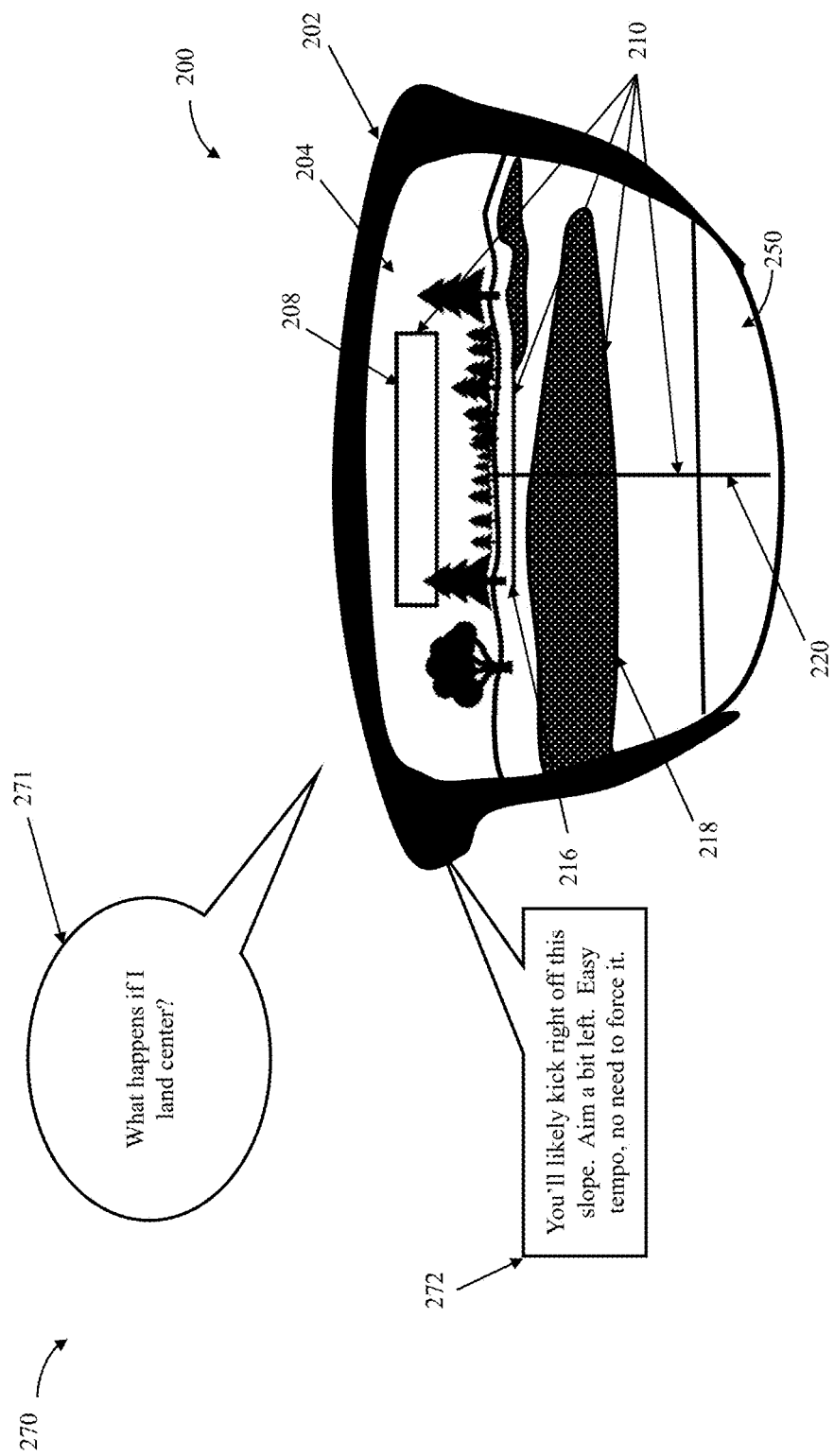

```
[After 18 holes, user finishes round]
+------------------------------------+
| Audio Summary:                     |
| "Great job out there! You improved your
| fairway hits on dogleg holes by 20%.
| If there's one takeaway: short approach
| shots lost you a few strokes, let's work
| on clubbing up next time!"
+------------------------------------+

Dialogue:
Recommendation Engine:
  "Round recap:
  -Solid driving on holes 3, 9, 15
  -Approaches short on 4 occasions
  -Next time, trust your yardage and add an
   extra half club when in doubt."

Golfer: "Thanks. That helps me plan my practice.
   I appreciate the encouragement!"
```

*FIG. 3C*

KINEMATIC RECOMMENDATION ACROSS DEVICES USING MACHINE LEARNING

TECHNICAL FIELD

The present disclosure relates to generating real-time kinesiology recommendations during physical activity, and more particularly, to synthesizing biometric and other observational data via a machine learning model and presenting analysis in a multimodal format.

BACKGROUND

Contemporary athletes have a breadth of electronic tools and advice they can avail themselves of in order to improve their athletic performance. Fitness training and tracking software applications can offer advice and encourage physical conditioning. Purpose-built computer systems with arrays of sensors can track athletic movement skills, such as swinging a golf club, throwing a baseball, shooting a basketball, or kicking a soccer ball, project trajectories, and propose postural, tactile, or fine motor adjustments, in service of helping the subject athlete improve. Other software applications can track other in-match performance, as well as ambient information such as weather, in order to provide match scoring, analysis, and metadata related to the match.

However, these tools and services are lacking in several materials ways. These contemporary systems utilize either bulky or stationary bespoke computer hardware, or generic mobile devices such as smartphones. The bespoke computer hardware is difficult to transport between matches, and cannot generally monitor athletes during their performance, as athletes move through a field or arena during a match, while the hardware is stationary. Conversely, a generic mobile device has several modest input and output components, such as cameras, microphones, and flat-panel displays. The substantial resource requirements for processing collected sensory data often result in sluggish performance in the generic mobile device that lags behind the athletes, preventing real-time analysis. Athletes would benefit from a system that is able to take readings and provide timely data to the athlete, at the athlete, in a way that is readily comprehensible to the athlete without distracting from their performance.

Contemporary systems also provide cold analytical data. As compared to a human instructor or advisor, contemporary systems do not vary their methods or means of communicating, in order to enhance its rhetorical effectiveness with the athlete and persuade or encourage the athlete to adopt their recommendations. As such, the emotionally-unintuitive provisioning of data can often result in the athlete's frustration, and ultimately their degradation in performance. Therefore, athletes would also benefit from systems that improves human-computer interaction by considering the athlete's physical and emotional state, providing not only advice that is motivational in terms of its substance, but also advice in a format that is palatable to the athlete at the time it is provided.

SUMMARY

The appended claims may serve as a summary of the invention.

BRIEF DESCRIPTION OF THE DRAWINGS

Example embodiments will now be described by way of non-limiting example with reference to the accompanying drawings, in which:

FIG. 2 illustrates a golf course, viewed through an example lens implementing an augmented reality (AR) overlay in conjunction with an audio output device.

FIG. 3C illustrates an example multimedia conversation with a subject regarding match analysis and advice for future matches.

DETAILED DESCRIPTION OF CERTAIN EMBODIMENTS

Figure 1:
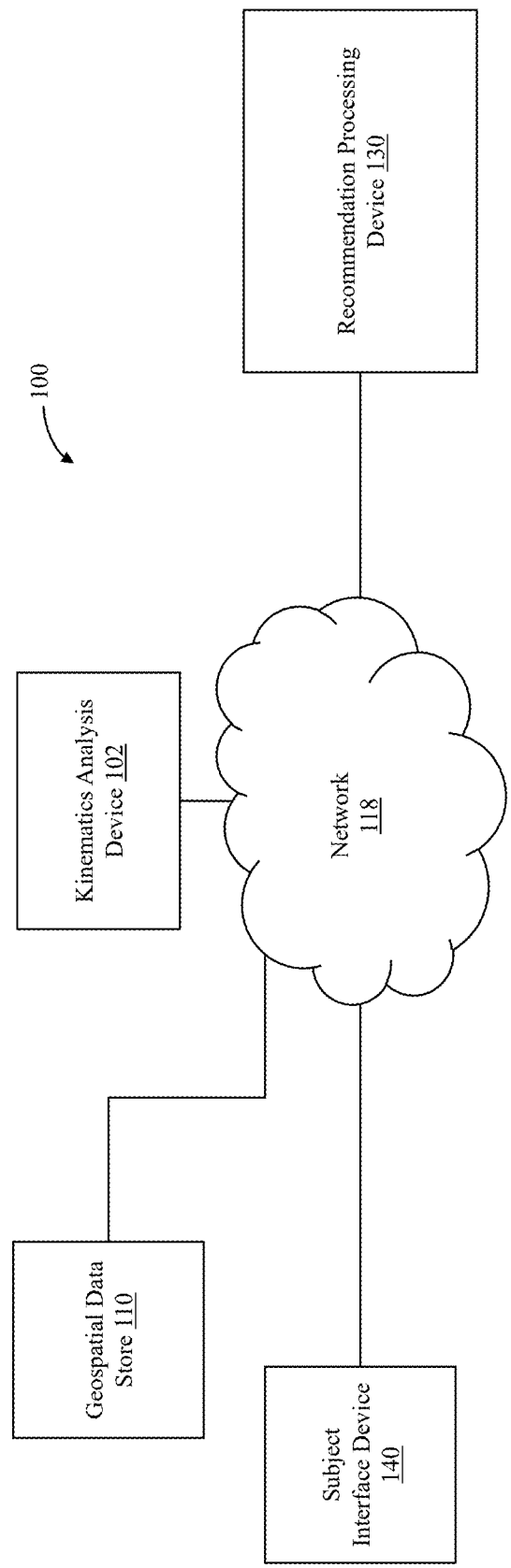
FIG. 1 illustrates an example networked computer system in which various embodiments may be practiced.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices are shown in block diagram form in order to avoid unnecessarily obscuring the example embodiment(s).

1. General Overview

A system preparing kinematic recommendations for athletes using artificial intelligence is disclosed. The system is programmed to sense personal physical data regarding a subject athlete, and optionally review environmental data, and historical performance and physical data related to the subject athlete. The system produces performance recommendations for that subject athlete, determines a best medium for providing the performance recommendations to the subject athlete based on their personal physical data, and provides the performance recommendations to the subject athlete via that determined best medium. The best medium can include an augmented reality (AR) interface worn by the athlete. The performance recommendations can be prepared by machine learning or artificial intelligence models designed to analyze athletic performances, and to communicate conversationally with the athlete.

In some embodiments, an interface device is programmed to survey using sensors an athletes current personal, kinematic data. The kinematic data can include how they move their body. The kinematic data can then be converted into a skeleton model or stick figure model, representing that body motion. The skeleton model or stick figure model representing the athlete can then be overlaid or compared to a skeleton model or stick figure model representing an idealized or perfect motion. The idealized or perfect motion can be derived, such as a model depicting a human with their arms fully extended after swinging a golf club, or can be recorded, such as a model depicting how a specific PGA golfer extends their arms after swinging a golf club, or a combination of both types of idealized and perfect models. Elaborating, the kinematic data can include a subject golfer swinging a golf club, and tracking some or all motion of their arms, legs, torso, head, the resulting golf club movement, or the resulting golf ball movement. The kinematic data can also include a comparison to how the subject golfer should ideally swing a golf club, (i.e., a comparison to the idealized or perfect motion skeleton model or stick figure model) and identify discrepancies—for example, identifying that the golfer has a rigid posture, when a relaxed posture would be ideal per the idealized or perfect model. The kinematic data can also include the athlete's heart rate, muscle fatigue, and other stress indicators. The kinematic data is then processed by an analysis module, and the state of the athlete can be ascertained. The state of the athlete can include their most recent athletic performance, e.g., their most recent golf swing, and can also include their current stress or fatigue level. The athlete state can be sent to a machine learning model, which can process the data together with data related to the environment or prior performance, as further discussed below, and produce a recommendation for the athlete, based upon the athlete state data. That recommendation can be parsed to determine a proper recommendation medium. For example, a stressed athlete may best benefit from a concise, visual recommendation, while a lethargic athlete may best benefit from an enthusiastic aural recommendation. The interface device, in possession of the recommendation and the proper recommendation medium, can then provide the athlete the recommendation over the medium that was previously determined to be best for the athlete.

In some embodiments, the above process is enhanced based upon the prior performance data of the athlete. For example, prior data may indicate that the athlete best responds to recommendations in an aural format when fatigued. Prior data may also indicate that, when the subject athlete is fatigued, they overly favor their non-dominant hand, and consequently hit golf balls off of an ideal travel line. Prior performance data may also include prior performance data of other athletes, as well as environmental data, such as the playing field and the weather. For example, prior athletes at the same point in the golf course regularly misjudge the distance to the target hole over a water hazard, and sink their struck golf ball in the water hazard. In such examples, the advice may be to not overextend and attempt to hit the golf ball short, and not over, the water hazard.

In some embodiments, dynamic and static environmental data can enhance the athlete recommendations. For example, wind and sunlight angle can affect ball trajectory and athlete visibility, and recommendations can include changing an intended trajectory of a ball to avoid bad visibility on a later hit, or to account for trajectory changes affected by wind.

In some embodiments, the format of the recommendation can dynamically change as the athlete commences a known routine. For example, an AR interface may show several trajectory and course hazard indicators but then detect that the athlete is facing down addressing their golf ball, and reduce the AR interface to show a proper spacing between the athletes two feet and the golf ball. Stepping away from the golf ball can bring back up the original AR interface, and drawing back to swing may remove all of the AR interface elements entirely, allowing the athlete to solely focus on the golf ball.

The system disclosed herein has several technical benefits. The system enables efficient kinematic data collecting and processing and presentation of recommended action via multiple communication channels, including an augmented reality (AR) interface. The AR interface, which can include a lens overlay and a two-way aural communication system, allows the communication of recommendations, feedback, and interrogatories by and with the subject without distracting the subject by requiring their interact with a device outside of their immediate scope of attention, such as a smart phone. By utilizing a machine learning model, the recommendations can be improved as the subject performs in a particular round of a match, as the subject completes matches, and as multiple subjects complete matches. The system can provide recommendations and new or updated recommendations in real-time, faster than a conventional coach or software application. Further, intelligently determining how to present the recommendations through the communication channels based on the inputs to and outputs from the machine learning model facilitates human-computer interaction and further improves the athlete's performance.

2. Example Computing Environments

FIG. 1 is shown in simplified, schematic format for purposes of illustrating a clear example and other embodiments may include more, fewer, or different elements.

In some embodiments, a kinematic recommendation system 100 comprises a kinematics analysis device 102 a geospatial data store 110, a recommendation processing device 130, and a subject interface device 140, which are communicatively coupled through direct physical connections or via a network 118.

In some embodiments, the subject interface device 140, which is configured to sense subject data, and present information including recommendations. The subject interface device 140 can comprise a desktop computer, laptop computer, tablet computer, smartphone, or wearable device. The subject interface device 140 can be configured to transmit the subject data to the kinematics analysis device 102 and receive recommendations from the kinematics analysis device 102. The subject interface device 140 can comprise two or more devices. In such examples, the subject interface device 140 can include an interface device configured to sense subject data and present recommendations, and a gateway device configured to process and render subject data and recommendations, as well as communicate with network 118. The interface device of the subject interface device 140 can be further subdivided into a sensor device, for sensing subject data, and a presentation device, which presents recommendations. An example implementation could include a biometric sensor as the sensor device worn as a strap on an arm or around the torso of a subject; a pair of AR spectacles with built-in speakers as the presentation device worn on the face of the subject, which presents recommendations via a visual display and an audio output; and a mobile device as the gateway device, securely connected via a wired or wireless connection to the biometric sensor and the spectacles, and communicating with other components of the kinematic recommendation system 100 via the network 118. In other embodiments, the spectacles are also capable of collecting biometric data, either alone or in concert with a discrete sensor device. Alternatively, an audio output device is separate from the pair of spectacles. For example, the audio output device can be part of the mobile device or a standalone device.

In some embodiments, the gateway device of the subject interface device 140 is a generic mobile device, implementing specialized software for interfacing with the sensor device or the presentation device. In other embodiments, the gateway device is a standalone component for processing and facilitating communication between the sensor device, presentation device, and the network 118. In some embodiments, the gateway device is integrated into the sensor device or the presentation device. The gateway device can also be in wired or wireless communication with the sensor device, presentation device, or the network 118. The gateway device may be physically coupled to the subject, or the gateway device may be nearby and in communication with the sensor device or the presentation device. For example, the presentation device may be worn on the face of the subject, the sensor device may be worn on the wrist of the subject, and the gateway device may be in a bag (such as a golf bag) near the subject—the gateway device would be in communication with the network 118 via a wireless LTE-type connection.

In some embodiments, the sensor device is a plurality of discrete sensor devices. The sensor device can include microphones, pulse oximeters, accelerometers, gyroscopes, electrocardiogram sensors, thermometers, electromyography sensors, skin conductance sensors, pedometers, pulse rate sensors, heart rate variability sensors, blood pressure sensors, respiratory rate sensors, skin temperature sensors, bioelectrical impedance sensors, barometers, glucose monitors, camera-based motion capture sensors, gyroscopic or inertial-based motion capture, foot pressure sensors, or any other type of sensor capable of capturing human biometric phenomena or human kinematic data. In some embodiments, the sensor is adjacent to or located on the physical body of the subject. In some embodiments, the sensors are remote from the physical body of the subject, and may use cameras, lasers, Light Detection and Ranging (LiDAR) sensors, Radio Detection and Ranging (Radar) sensors, infrared sensors, ultrasonic sensors, time-of-flight cameras, stereoscopic cameras, microwave sensors, rangefinders, photodetectors, or other sensors capable of detecting human biometric phenomena or human kinematic data.

In some embodiments, sensor data from one or more sensor devices is combined to form a stream or singular source or reading of data. For example, multiple marker-based motion capture sensors may be located on the limbs or joints or a subject, and the relative positions of the motion capture sensors to one another may be calculated to provide a depiction of movement of the subject. Multiple oximeters may be combined to provide an average blood oxygen level, or find an extreme blood oxygen level. In some embodiments, the sensor data can be combined by a gateway device, or another device connected to the network 118. In some embodiments, the sensors may be embedded in, target, or track physical objects related to the physical athletic endeavor of the subject. For example, sensors may be located inside a golf club or may be configured to track a golf ball at a distance or remotely. Data produced by such sensors includes kinematic data and can be used to derive biometric data. For example, a sensor in a golf club could detect the force with which a golf ball is struck or a smoothness of swing in a direction lateral to the swing path, and determine a level of fatigue in the subject athlete-which can be supplemented by electromyography sensors or glucose monitors in order to build a more complex or accurate view of the level of fatigue in the subject athlete. Equipment sensors, for example in the golf club, can also collect information not traditionally considered human kinematic data, such as the golf ball trajectory or golf ball first bounce distance or velocity-such information can be included among the kinematic data discussed herein.

In some embodiments, the presentation device is a plurality of discrete output devices and input devices besides the sensors discussed above to help initiate and direct the presentation. The presentation device can include microphones, speakers, display screens, touch screens, display overlays, projectors, keyboards, mice, backlighting, or any other type of interface mechanism. In some embodiments, the presentation device is adjacent or located on the physical body of the subject. In some embodiments, the presentation device is remote from the physical body of the subject. In certain embodiments, the presentation device can be adjacent to or located on the subject but project or cast information onto a remote surface or interface; likewise, the presentation device can be remote from the subject, but project or cast information onto the physical body of the subject or an area nearby.

In some embodiments, the geospatial data store 110 is a device which maintains a database or data store of geospatial data. Geospatial data can include weather, coordinates, images or videos, or tagged qualities of locations where the subject may perform athletics. Tagged qualities can include subjective assessments of phenomena, for example a sandy area of a golf course may be tagged as a "sand trap" and assigned properties of a generic sand trap, rather that particular qualities such as the type of sand used or the current water content of the sand in the particular sand trap. The coordinates can include three-dimensional data and can map out a course or arena. Such data can be used in concert with sensor data from one or more subject interface devices 140 to determine where a subject or their equipment is in relation to the course or arena, or where multiple subjects are in relation to one another. Geospatial data can be provided by the subject interface device 140, and can include real-time and historical coordinates of the subject, as well as coordinates and qualities of different portions of the golf course, such as the position and size of hazards determined via photos or videos captured by the subject interface device. Geospatial data store 110 can be maintained by a separate third-party not directly responsible for the other devices in the kinematic recommendation system 100, such as the Professional Golfers' Association of America (PGA) or the National Oceanic and Atmospheric Administration (NOAA). Geospatial data can also include derived data regarding courses or arenas: for example, if the perimeter of a football field is known, the midfield line may be derived or calculated based on the geometry of the football field coordinates, rather than ascertained based on photo evidence or user input.

In some embodiments, the recommendation processing device 130 can be configured to receive input data via the network 118, and generate recommendations for ultimate usage at the subject interface device 140. The recommendation processing device 130 can include a programmed deterministic application, which receives numerical data such as the sensor data sensed at the subject interface device 140, can perform calculations based on the sensor data, can perform a database lookup, and ultimately return a recommendation based upon the input. For example, the recommendation processing device 130 could be provided a golf club swing speed of 72 miles per hour, and positional data indicating the baseball bat had exited a baseball strike zone before a baseball had entered the baseball strike zone. The recommendation processing device 130 could include programming indicating that IF bat swing speed is greater than average, and baseball bat position is greater than strike zone position when baseball is equal to strike zone position, THEN recommend decreasing bat swing speed. That recommendation could then be provided to the kinematics analysis device 102 for formatting and transmission to the subject interface device 140.

In some embodiments, the recommendation processing device 130 can be configured to perform deep learning, and provide recommendations based upon multivariate input into a trained model, which produces a recommendation. In some embodiments, the recommendation processing device 130 can be configured to receive human-readable, text-based prompts which encompass or include the subject sensor data as well as environmental data, and return recommendations as human-readable outputs. In some embodiments, the recommendation processing device 130 is configured to implement generative artificial intelligence (Gen AI) based on large language models (LLMs), and in further embodiments, the recommendation processing device 130 is configured to train and execute an LLM or other deep learning model. In the context of what prompts the recommendation processing device 130 is capable of receiving and what outputs data the recommendation processing device 130 is capable of returning, in some embodiments "human-readable" data can include written natural language or written language with customized although conventionally incorrect spelling, grammar, or syntax.

The recommendation processing device 130 can also be programmed to receive sensor data from subject interface device 140 or the geospatial data store 110 directly or through the kinematics analysis device 102, in a human-readable format or in a numerical or binary format, such as a vector embedding. The recommendation processing device 130 can return recommendation output to the subject interface device 140 directly or through the kinematics analysis device 102, in a human-readable format or in a numerical or binary format, such as a vector embedding.

The network 118 may be implemented by any medium or mechanism that provides for the exchange of data between the various elements of FIG. 1. Examples of the network 118 include, without limitation, one or more of a cellular network, communicatively coupled with a data connection to the computing devices over a cellular antenna, a near-field communication (NFC) network, a Local Area Network (LAN), a Wide Area Network (WAN), or the Internet, a terrestrial or satellite link.

In some embodiments, the kinematics analysis device 102 is programmed to receive one or more requests to process sensor data from the subject interface device 140, or geospatial data from the geospatial data store 110, and provide recommendations to the subject interface device 140. In certain embodiments, at least a portion of the subject interface device 140, geospatial data store 110, or the recommendation processing device 130 is integrated into the kinematics analysis device 102.

In some embodiments, the kinematics analysis device 102, in concert with the recommendation processing device 130, receives sensor data from the subject interface device 140, combines the sensor data as needed, and reformats the sensor data into a format comprehensible by the recommendation processing device 130. For example, the subject interface device can provide a time series of discrete heart rate readings. The kinematics analysis device 102 can store the heart rate readings, compare those to a baseline heart rate, and determine a level of stress. The kinematics analysis device 102 can then convert that level of stress into a statement to be incorporated into a prompt for the LLMs. The LLMs can convert a 90 BPM heart rate reading from the kinematics analysis device 102 into the statement that "the subject has a high level of stress, but is not experiencing tachycardia", in particular when configured or prompted to do so by the kinematics analysis device.

In some embodiments, the kinematics analysis device 102 can also translate recommendations into audio, video, or other media data. For example, the kinematics analysis device 102 can convert a text string reading "take three steps to the right" into an audio stream reciting "take three steps to the right" to be played through a speaker at the subject interface device 140. In another example, the kinematics analysis device 102 can receive the same text string reading "take three steps to the right." The kinematics analysis device 102 can request pixel data from an AR interface, indicating where on the AR interface the subject's feet currently are located. Alternatively, the AR camera of the subject interface device 140 transmits a video feed, and the kinematics analysis device 102 determines at which pixels the subject's feet are currently located: for example, at the $200^{th}$ pixel on an X-axis. The feet of the subject can be identified using computer vision software configured to identify typical elements relevant to the athletic endeavor, in golf, such elements can include as hands, feet, golf clubs, golf balls, holes, flags, greens, fairways, hazards, or other players. The kinematics analysis device 102 can then determine how many pixels to the right three steps would place the feet of the subject: for example, sixty pixels. The kinematics analysis device 102 could then send a wireframe image of generic feet or shoes to the subject interface device 140, with instructions to render the wireframe image at the $260^{th}$ pixel on the X-axis. The subject interface device 140 would then render the image on the AR display as instructed. The subject would then have visualized a target location for their feet to be located at (e.g., three steps to the right) rather than a written or aural instruction to take three steps to the right.

In some embodiments, the recommendation processing device 130 can provide numerical recommendations, for example a heading and a velocity. The kinematics analysis device 102, using a method similar to that described above, can utilize the heading and velocity numbers from the recommendation processing device 130 to instruct the subject interface device 140 to render, for example, a wireframe arrow which appears to the subject to be pointing in the direction of the heading, and have a size or magnitude which conveys the recommended velocity.

In some embodiments, the kinematics analysis device 102 is programmed to receive real-time data related to a golfer from the subject interface device 140 and real-time data related to the golf course from the geospatial data store 110. The kinematics analysis device 102 is programmed to generate a prompt based on the received data and transmit the prompt to the recommendation processing device 130 for processing by LLMs. The kinematics analysis device 102 is programmed to then receive coaching data for the golfer from the recommendation processing device 130. The kinematics analysis device 102 is programmed to then convert the coaching data to be communicated by a combination of an AR display and an audio output device. The kinematics analysis device 102 is programmed to then transmit the converted data together with communication instructions to the subject interface device 140 for presentation to the golfer.

3. Functional Descriptions

In some embodiments, the kinematics analysis device 102, the recommendation processing device 130, a geospatial data store 110, and the subject interface device 140 can each be programmed to perform specific functions, as discussed in various embodiments herein. These functions can be implemented as software components, general or special-purpose hardware components, firmware components, or any combination thereof. These functions can utilize or enhance features discussed above.

3.1. Model Training

In some embodiments, an LLM is used to produce the kinematic recommendations. The LLM can be trained, fine-tuned, or augmented by the kinematics recommendation system 100-in some embodiments, the LLM is a public LLM model. The LLM can be provided a detailed prompt by the kinematics analysis device 102, which inserts measured or calculated values from the subject interface device 140 into predefined prompt variables. The prompt can also include values from historical performance of a group of subjects on a group of golf courses or from the geospatial data store 110. The prompt can also instruct producing golfing coaching or guidance in terms of a vector that corresponds to a variety of aspects of the golfer's next configuration or movement on the golf course, such as the position of the shoulder and feet or the height to which to raise the arms. The LLM can also be instructed to produce information related to the objective of the coaching or guidance, such as the expected position of golf ball or the expected number of additional swings before putting. The prompt can define a response format which conforms to an expected format by the kinematics analysis device 102. For example, the prompt could instruct translating the vector into suggestions or instructions in natural language in a specific tone.

In some embodiments, a trainable machine learning model is used to produce the kinematic recommendations. The machine learning model can be provided data including subject sensor data, external performance data (e.g., scores or locations where a golf ball is hit on a course), corresponding geospatial data, as well as corresponding coaching or guidance from an expert golfer or other sources that could be considered as the ground truth. The model can be periodically retrained as additional data regarding performance data associated with subject sensor data and geospatial data is collected. For continuous learning, the kinematics analysis device 102 can be configured to associate recommendation content generated by the trained learning model with subsequent performance data as well as subsequent sensor data, which can serve as an evaluation of the recommendation content. The kinematics analysis device 102 can be further configured to identify recommendations that produce the highest-quality external performance data. External performance data can be numerically graded in at least two ways: as objective performance data (e.g., further golf drives are better than short golf drives) and as subjective performance data (e.g., long golf drives from a historically poor golfer are better than long golf drives from a historically good golfer). Such recommendations can then be taken as the ground truth for the corresponding subject sensor data, geospatial data, and historical performance data and be added to the training dataset. The trained model can then produce recommendations that, congruent with the input data provided, are associated with the best performance data, on an objective, subjective, or combined objective-subjective basis.

In some embodiments, the kinematics analysis device 102 can be programmed to determine how to communicate recommendations between at least the visual output and audio output based on the input data to the LLM discussed above, the output data from the LLM, and characteristics of the output devices. The input data that is especially relevant includes the subject's stated preference between visual and audio, the subject's past response (e.g., following visual instructions more than audio instructions or paying more attention to a particular output device under specific circumstances), the subject's current physical or mental condition (e.g., clogged ear, poor vision, or stress), and the weather (e.g., causing water damage or loud noise). The output data, namely the recommendations, can be considered in terms of the complexity, specific nature (e.g., graphical vs. narrative), tone and other features likely to affect the subject's physical or mental condition). In terms of characteristics of the output devices, a video device can generate graphics and colors, requires good light, and has a certain resolution, for instance, and an audio device can generate sounds and tones, requires low noise, and also has a certain resolution for instance. The 102 can be programmed to determine that the visual output and the audio output are to be communicated simultaneously or in a certain order or that one type of output is to be skipped. For example, the determination result can indicate which part of the recommendation is to be communicated to a particular output device and a corresponding time of communication. The determination can be aided by another LLM, or any other machine learning model based on proper training data. In certain embodiments, the kinematics analysis device 102 can be programmed to communicate the recommendations through additional types of output devices, such as the golf club that outputs tactile data.

3.2. Model Execution

FIG. 2 illustrates an example lens of spectacles implementing an AR overlay and communicating with a subject, the lens facing a golf course during a round of golf being played by the subject. In an embodiment discussed herein, an augmented reality device 200, such as a pair of spectacles 202 projects a digital overlay onto or into lens 204. Digital data can be represented in the field of vision of a subject wearing the spectacles 202, overlaid on a view of the visible environment 250. The augmented reality device 200 is a presentation device as discussed above, and in this example also functions as a sensor device as well as a gateway device. The augmented reality device 200 utilizes a pulse oximeter in the earpiece of the spectacles 202 as a biometric scanner. The spectacles 202 also include a forward-facing camera, which can be used to inform the position of the spectacles and the subject. This particular augmented reality device 200 is designed to be used to assist a subject athlete in the playing of golf, but other athletic endeavors are contemplated.

In some embodiments, the augmented reality device 200 captures orientation data of the augmented reality device 200, and in particular the orientation of the lens 204, in the form of images from the forward-facing camera. These images are transmitted to the kinematics analysis device 102. The augmented reality device 200 also transmits the Global Positioning System (GPS) coordinates of the augmented reality device to the kinematics analysis device. The kinematics analysis device 102, upon receiving the orientation images and the GPS coordinates, retrieves from the geospatial data store 110 a record including the golf course most closely correlated to the GPS coordinates, and either subsequently or instead, retrieves from the geospatial store 110 a record including the particular hole of golf most closely correlated to the GPS coordinates, and the golf course. The kinematics analysis device 102 can request imaging data of the golf hole or a portion of the golf hole, and utilizing the GPS coordinates of the augmented reality device 200 and the orientation data of the augmented reality device 200 as compared to the imaging data of the golf hole, can determine both the position and the orientation in three dimensions of the augmented reality device 200.

In some embodiments, the kinematics analysis device 102 can retrieve golf course or hole information. Golf hole information can include statistical information about the golf hole, such as par and distance to the green. Hole information can also include an area or volume mapping of topographical features of the golf course, including hazards boundaries. The kinematics analysis device 102 can then transmit the position and orientation of the augmented reality device 200, and the hole information to the recommendation processing device 130. The golf course information can be static, historical, or real time data, and can pertain to the environment, including weather or other man-made conditions. The information can also include course status, such as whether the course is open or closed; whether the fairway is clear of other parties, or whether the subject should exit the course for safety reasons. The information can also include information relevant to golf, for example displaying how well famous professional golfers have previously performed on the course or hole, possibly in contrast to the subject.

In some embodiments, the data, such as the position, orientation, and hole information, is included with or within a prompt. The prompt can also include data described above, including sensor data regarding the subject, as well as real-time and historical performance data. When the recommendation processing device utilizes an LLM, data queries or prompts sent to the recommendation processing device 130 should describe the format of the incoming data, as well as a desired format for the response data. Descriptions of incoming and expected response data can assist the recommendation processing device 130 in producing recommendations. In this example, the prompt describes the input data, and additionally requests that the LLM respond with a vector describing the best direction and force for this particular golfer to strike a golf ball, to preferably place the ball on the green, or alternatively place the ball on the fairway, outside of hazards, as close to the green as possible, with an unobstructed line of sight to the green. The prompt can request that the LLM respond with other instructions or advice, which may be similar to the advice provided by a human coach. The instructions or advice could cover athletic elements such as grip, stance, alignment, backswing, downswing, follow-through, etc. The response data from the LLM can also describe or instruct the rendering of other data, such as outlines or depictions of the subject's body or their golf club or golf ball. The renderings can be directly overlaid on corresponding objects, or can indicate ideal positions for those objects. For example, if the subject should tuck their elbows into their abdomen further, the rendering can depict a representation of the elbows of the subject closer to the abdomen of the subject. When the display is augmented reality, the abdomen of the subject can be rendered, or the elbow renderings can be rendered as an augmentation on the reality of the real abdomen of the subject, as seen through the AR display.

In some embodiments, the recommendation processing device 130 receives the prompt including the data and instructions, and preferably responds with a component form vector describing the direction and magnitude of an ideal golf drive. The kinematics analysis device 102 receives the vector and generates instructions for 140.

In some embodiments, the kinematics analysis device 102 utilizes the orientation of the augmented reality device 200. The kinematics analysis device 102 transforms the response vector into a collapsed two-dimensional display image, based upon the orientation of the augmented reality device 200. The display image is sent to the augmented reality device 200, where the display image is rendered onto the lens 204 of the spectacles 202 as an aim line 220. The augmented reality device 200 can utilize an API such as ARCore or ARKit. Generally, the API exposes sensors and output displays or speakers to be directly manipulated by authenticated devices (e.g., stream decimal data from the heart rate sensor, or play the following audio stream at the speakers.) In some cases, the augmented reality device 200 API can allow for material processing to occur on the augmented reality device 200, and the API in such circumstances can receive files or commands, and return files or analysis rather than pure data streams.

In some embodiments, the augmented reality device 200 repeatedly reports the orientation and position of the augmented reality device 200, as well as the sensor data describing the subject. The orientation and position can be reported at different cadences. In this example, when the augmented reality device 200 has not changed position substantially, a new response vector is not required from the recommendation processing device 130. Instead, when the kinematics analysis device 102 determines that, while the augmented reality device 102 has moved, the position from which the subject will ultimate shoot has not changed, and therefore the existing response vector is still correct. The response vector in this example is based on the relationship between the golf ball and the hole, for example, the response vector describes an 85 mile per hour golf ball moving on a heading of 35 degrees due North-if the subject steps away from the tee to their golf bag, the overall recommendation remains the same (85 miles per hour at) 35° when they return to the tee, and does not need to be recalculated. However, because the visual depiction of the response vector as rendered is depicting the relationship between the golf ball and the hole, as perceived from the viewership point and orientation of the augmented reality device 200, whenever the augmented reality device 200 move that perception of the response vector from the perspective of the augmented reality device 200 changes, and therefore need to be re-rendered. For example, when the augmented reality device 200 is facing the hole at 35 degrees due North, the augmented reality device 200 will depict the response vector as generally pointing straight ahead, since both the augmented reality device 200 and the response vector are aligned on the same compass angle. However, when the subject approaches the golf ball, they are facing perpendicular to the hole, or at 125 degrees due North. In that example, the response vector will be rendered as perpendicular to the augmented reality device 200, extending from the right to the left, towards the hole. The value the response vector represents is unchanged, but the rendering and representation of that value is changed as the point of view represented in the augmented reality device 200 has changed.

In such examples, the kinematics analysis device 102 can re-render the display image based upon the position and orientation of the augmented reality device 200, and send the re-rendered display image to the augmented reality device 200 to update the display on the lens.

In some embodiments, a similar process occurs based on the hazard data. The hazard data having written descriptions of a hazard area can be provided to the recommendation processing device 130, with a prompt instruction asking for a representation of an area or volume describing the hazard area. In other embodiments, where a machine learning image processing model is utilized, the images of the golf course, or from the augmented reality device 200 can be provided to the recommendation processing device 130, along with a prompt requesting the identification of golf hazards, and boundary areas or volumes of the identified hazards. The hazard boundaries, when properly tagged, can also be provided directly from the geospatial data store 110. The recommendation processing device 130 can also pre-process images of known golf courses, and store or cache hazard boundary data in the geospatial data store 110 for later retrieval. The hazard boundaries can then be rendered into two-dimensional images for display on the lens 204, in order to assist the subject in identifying hazards on the course.

In some embodiments, historical performance data is maintained. In this example, the historical performance data can be the performance of the subject, or of other subjects. The historical performance data can include prior performance in the current round of golf, or prior performance in a prior round of golf, on the same hole the subject currently is playing, the same course the subject currently is playing, or other courses the subject has played. Historical performance data can be sent to the recommendation processing device 130, which can return line, area, or volume data, which in this example describes locations where the subject has previously hit the golf ball when playing on the particular hole the subject is currently playing, based on current coordinates of the augmented reality device 200. The kinematics analysis device 102 can prepare a two-dimensional image of the prior performance data, which can be rendered on the lens 204 as prior hit locations 216.

In some embodiments, it can be advantageous to represent data in a numerical format for the subject. The kinematics analysis device 102 can prepare a two-dimensional image of a measurement area 208, which can display numerical data returned as a recommendation from the recommendation processing device 130. For example, the measurement area 208 can include a desired golf ball speed at contact in order to effectively follow the aim line 220. The measurement area 208 can also include the current weather, or a distance to the green or the pin. The measurement area 208, in particular when based upon data from the geospatial data store 110, may not be populated by the recommendation processing device 130. For example, the kinematics analysis device 102 can transform numerical data from the geospatial data store 110 into two-dimensional overlay images without the assistance of the recommendation processing device 130. It is contemplated that the augmented reality device 200 can also prepare renderings, and in such examples when data is captured at the augmented reality device 200, such data can be rendered and displayed at the augmented reality device 200 without the assistance of the kinematics analysis device 102. For example, the augmented reality device 200, having access to the compass heading of the augmented reality device 200, the oxygen level of the subject, and any text messages the augmented reality device 200 or a coupled smart phone has received, can render a compass heading, a blood oxygen percentage, or a new message notification without the assistance of the kinematics analysis device 102 or the recommendation processing device 130.

In some embodiments, the augmented reality device 200 can receive speech from the subject and present audio to the subject. Back-and-forth audio to and from the subject can be considered a conversation. Either the augmented reality device 200 can initiate or terminate a conversation, or the subject can initiate a conversation. In this example, the subject speaks "What happens if I land center?". A microphone in the augmented reality device 200 takes this audio snippet, and transmits it to the kinematics analysis device 102. The kinematics analysis device 102 transcribes the audio snippet into text, and appends contextual information, such as the position of the augmented reality device 200 and course or hole information. The kinematics analysis device 102 can do the appending intelligently, or can append all current or historical data relevant to the subject. The kinematics analysis device 102 transmits the text and contextual information to the recommendation processing device 130, along with a prompt instruction providing context regarding the subject, the athletic endeavor (i.e., golf), and a desired response format. The recommendation processing device 130 can then produce a response and transmit the response to the kinematics analysis device 102. Alternatively, the kinematics analysis device 102 can transmit the transcription of the audio snippet, and a prompt instruction requesting a desired response format, but additionally indicating that the kinematics analysis device 102 can return additional contextual information (i.e., from the geospatial data store 110 or the augmented reality device 200) when the recommendation processing device 130 would benefit from such data.

The recommendation processing device 130 ultimately returns a recommendation response, in this example including a text string "You'll likely kick right off this slope. Aim a bit left. Easy tempo, no need to force it." The response can also include a tone cue, such as "formal", "friendly" "stern", or "congratulatory". The response is received by the kinematics analysis device 102, and converted from a text string into an audio file representing the text as aural language. When a tone cue is provided, the kinematics analysis device 102 can record the aural recording in the emotional tone suggested by the tone cue. The audio file is sent to the augmented reality device 200, and played via a speaker such that the subject can hear the text string, optionally in the tone proposed by the recommendation processing device 130.

In some embodiments, the kinematic recommendation system 100 can be triggered to produce a recommendation, re-render or re-present a recommendation, or capture additional data such as the speech of the subject based on any sensor input changes, including a new user query. In some embodiments the kinematic recommendation system can consider inputs from all sources in generating a recommendation, including sensors and stored data, and communicate recommendations to any or all possible output devices, including the AR display and the speaker.

In some embodiments, the augmented reality device 200 input does not necessarily match the output: meaning, if the input to the augmented reality device 200 from the user is verbal, the response format is not necessarily verbal—the response to a verbal query could be a visual display on the AR display; the input could be a rising pulse rate, and the output could be vibration caused one or more components of the subject interface device. For example, a pulse oximeter reading can result in an audio file telling the subject to "calm down" in a relaxing tone. A spoken request for an updated recommendation based on the ball being moved can result in a re-rendered aim line 220, the request having been ultimately processed by the recommendation processing device. 130.

3.3. Example Conversations

Figures 3A, 3B:
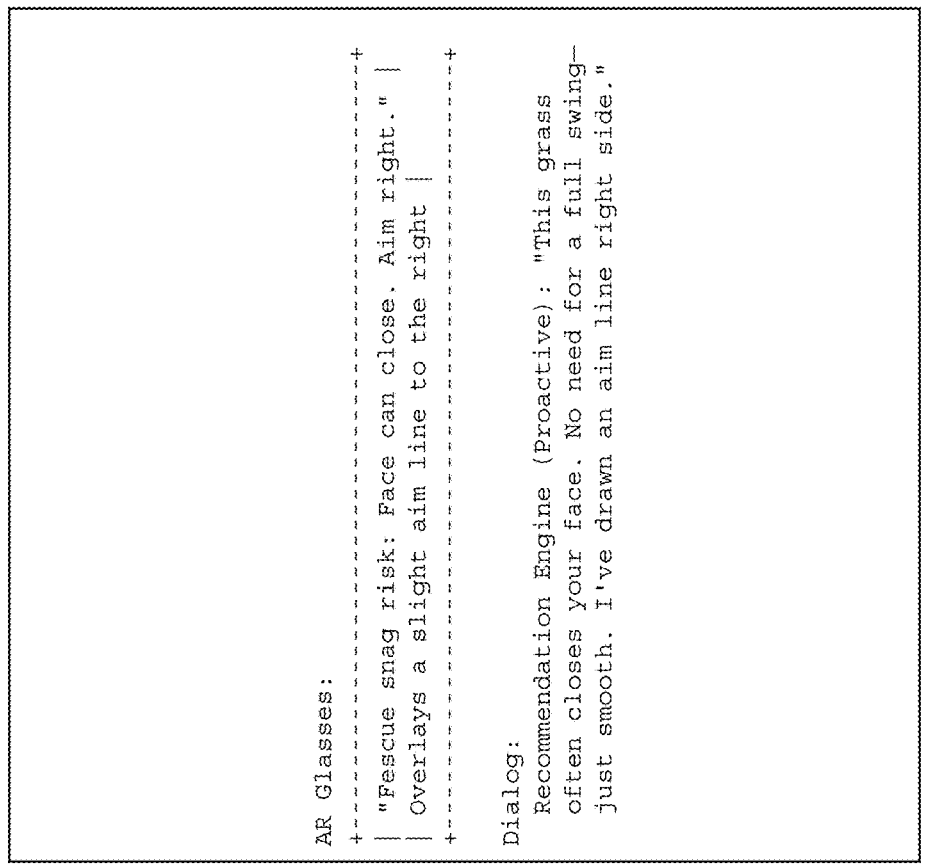
FIG. 3A illustrates an example multimedia conversation with a subject regarding topography insights.
FIG. 3B illustrates an example multimedia conversation with a subject regarding advice for next performance.

FIG. 3A illustrates an example multimedia conversation with a subject regarding topography insights. FIG. 3B illustrates an example multimedia conversation with a subject regarding advice for next performance. FIG. 3C illustrates an example multimedia conversation with a subject regarding match analysis and advice for future matches. In FIGS. 3A, 3B, and 3C, data is represented in two parts: a first portion identified as "AR Glasses" which includes a depiction of text displayed on the lens 204 of the augmented reality device 200, and "Dialog" which includes a conversation between the subject (identified as "Golfer") and the kinematic recommendation system 100 via the augmented reality device 200 (identified as "Recommendation Engine").

In FIG. 3A the kinematic recommendation system 100 has identified a slight downhill in the direction the subject is hitting. The augmented reality device 200 displays "Terrain slopes left→right, ball might kick R" in the lens 204, and renders grey contour lines to show the slope. The contour lines can be calculated based upon data observed via cameras in the augmented reality device 200, or based on data from the geospatial data store 110. The display text is requested by the kinematics analysis device 102 based upon observed physical phenomena, rather than an explicit request from the subject. In such examples, the kinematic analysis device 102 can transmit all of the data in possession relevant to the subject, and include an instruction prompt which requests the best golf advice for the next swing. As above in FIG. 2, the subject has explicitly asked "What happens if I land center?" and the kinematic recommendation system 100 has processed that question and responded with a played audio file reciting "You'll likely kick right off this slope. Aim a bit left. Easy tempo, no need to force it."

In FIG. 3B the kinematic recommendation system 100 has identified a risk of a fescue snag and provided a recommendation. Based on the recommendation, the augmented reality device 200 displays "Fescue snag risk: Face can close. Aim right" and render an aim line 220 to the right of center of the typical aim line. The recommendation processing device 130, based upon prior performance by other subjects and this subject on prior golf holes, can determine that this recommendation is best communicated with a high urgency given its significant impact especially since it is expected to induce low stress given that its nature unrelated to the subject's performance. Therefore, the response from the recommendation processing device 130 instructs the augmented reality device 200 to return the response via the speakers of the augmented reality device 200, and to do so proactively, without waiting for the subject to ask for a recommendation. The augmented reality device 200, following the instructions, plays the resulting audio file proactively, and does not wait for a signal or question from the subject. The kinematics analysis device 102 in some embodiments transforms the response from the recommendation processing device 130 into a format comprehensible to the augmented reality device 200, for example conforming to an application programming interface (API) set out by the augmented reality device 200, and providing the recommendation as a playable audio file, rather than as written text which would be transformed into audible speaker output.

In some examples, recommendations or advice can be reduced or reformatted when the sensor values indicate that the subject is stressed. For example, a stressed subject can respond poorly to multiple recommendations, and as such the kinematic recommendation system 100 may only provide a single recommendation. When the subject is excited, the kinematic recommendation system 100 may provide recommendations via audio rather than video, in an attempt to better capture the focus of the subject. Recommendations, particularly visual recommendations, may also fade or reduce in intensity as the subject begins to perform, such as addressing the golf ball or commencing their swing.

In FIG. 3C, the subject has completed their round of golf, and the kinematic recommendation system 100 prepares a summary. The visual data in this example describes the dialogue, but the visual data does not perfectly match the actual dialogue: the recommendation processing device 130 has prepared two separate recommendations, one in a written format for display, and a similar but not the same audio file. The display text has a more energetic tone, while the aural data is more clinical in tone. The recommendation processing device 130, based on prior kinematic recommendation system 100 performance, may have determined that showing and persisting positive information, while temporally reciting statistical information results in superior outcomes for subjects. Prior performance data can have shown that subjects that receive neutral or negative feedback at the end of their round take longer gaps between rounds, and perform more poorly when they return to golf, than subjects which receive positive feedback at the end of their round. Therefore, the positive feedback results in superior outcomes in future golf outings. The subjects remember how they feel at the end of a round (e.g., excited) more than they remember specific statistics regarding their play.

In this example, the subject has replied with a follow-up response or feedback, which is generally positive regarding the quality of the recommendations ("That helps me plan my practice.") and the format of the recommendations ("I appreciate the encouragement!"). This follow-up response or feedback can be processed by the recommendation processing device 130, and can be used to train a learning model in the recommendation processing device 130, the kinematics analysis device 102, or any learning model in the kinematic recommendation system 100. In some examples, the recommendation processing device 130 prepares data before receiving a probable follow-up response. For example, the recommendation processing device 130 may prepare expected yardages if the subject continues using their 5-iron golf club. However, the recommendation processing device 130 can be configured to also prepare expected yardages for the subject using their 6-iron or 7-iron golf club. This preparing of data can be based on historical behavior patterns of the subject: the subject may often ask for hypothetical alternative yardages based on other golf clubs in their golf bag. In some examples, the kinematic recommendation system 100 can operate more efficiently when the recommendation processing device 130 processes in parallel or in the same query several likely inputs or recommendations which utilize the same base data (e.g., subject interface device 140 collected data, geospatial data store 110 data, or kinematics analysis device 102 data). The follow-up response can then be handled by the kinematics analysis device 102 using the prepared data from the recommendation processing device 130, or the kinematics analysis device 102 can provide a simpler query to the recommendation processing device 130.

FIG. 3C also demonstrates several recommendation processing features of the kinematic recommendation system 100. The dialogue section includes "Solid driving on holes 3, 9, 15" and "approaches short on 4 occasions". The determination of solid driving, or short approaches, are examples of recommendation conformances. For example, on hole 3, the kinematic recommendation system 100 made a recommendation to the subject on how to hit the golf ball. Subsequently, the subject hit the golf ball, and the kinematic recommendation system 100 collected data regarding that hit. The data may include the swing speed, and a subsequent position of the golfer when they next approach their golf ball after swinging (thereby indicating the resting position of the golf ball as the position of the kinematic recommendation system 100 at the time the golf ball is re-recognized in a static location after being hit.) That data regarding swing speed and golf ball resting position can be compared to the swing speed and golf ball resting position the kinematic recommendation system 100 intended the subject to produce based on the provided recommendation. For example, the kinematic recommendation system 100 can have determined the ideal location for the golf ball to rest for this particular subject on this particular hole is approximately 90 yards from the green, on the left side of the fairway. The kinematic recommendation system may determine the subject hit the ball approximately 85 yards from the green, on the left side of the fairway. In such an example, the kinematic recommendation system 100 can determine a high recommendation conformance between the intended outcome by the subject when provided a particular recommendation, and the actual outcome by the subject when provided a particular recommendation. In another example, if the kinematic recommendation system 100 provides a recommendation, and the subject slices the golf ball into the trees and over 200 yards from the green, the kinematic recommendation system can determine a low recommendation conformance between the intended outcome (hit the golf ball a long distance down the fairway towards the green) and the actual outcome (hit the golf ball a short distance, off the course, and into the rough).

In some embodiments, recommendation conformances can be presented directly to the subject. Displaying "Solid driving on holes 3, 9, 15" is displaying the high recommendation conformance for the recommendations during driving on holes 3, 9, and 15: the recommendation resulted in high conformance drives. Likewise, displaying "Approaches short on 4 occasions" is displaying low recommendation conformance for the recommendations during those 4 occasions: the recommendations resulted in low conformance approaches. The recommendation conformances can be presented in a different format than the original recommendation: for example, the driving recommendation on hole 3 can have been presented as a two-dimensional display vector in the AR lens 204, depicting an arrow pointing toward the left side of the fairway, and the number "90'" displayed below the arrow, while the recommendation conformance is presented as audio via a speaker at the end of the round.

In some embodiments, retrospective kinematic recommendations can be presented. Continuing the example above, the driving recommendation on hole 3 could have been presented as a two-dimensional image of a vector with a numeral indicating the desired distance to the hole. In this example, that recommendation format resulted in a high recommendation conformance outcome, where the subject actually performed as the kinematic recommendation system 100 intended the subject to perform. In this example one of the short approaches was on hole 4, and further in this example the recommendation was provided as an audio instruction to "Focus up and hit the ball as hard as you can". In this example, that recommendation resulted in a low recommendation conformance outcome, as the subject ultimately hit the golf ball short. Upon reaching hole 9, the kinematic recommendation system 100 can analyze the high recommendation conformance outcome of hole 3, and the low recommendation conformance outcome of hole 4, and identify that, based on the results of the two differing recommendation formats, the format used on hole 3 should be re-used on hole 9, rather than the recommendation format used on hole 4. Using the identified recommendation format from hole 3 to present the recommendation for hole 9 results in producing a retrospective kinematic recommendation for the subject on hole 9.

4. Example Processes

Figure 4:
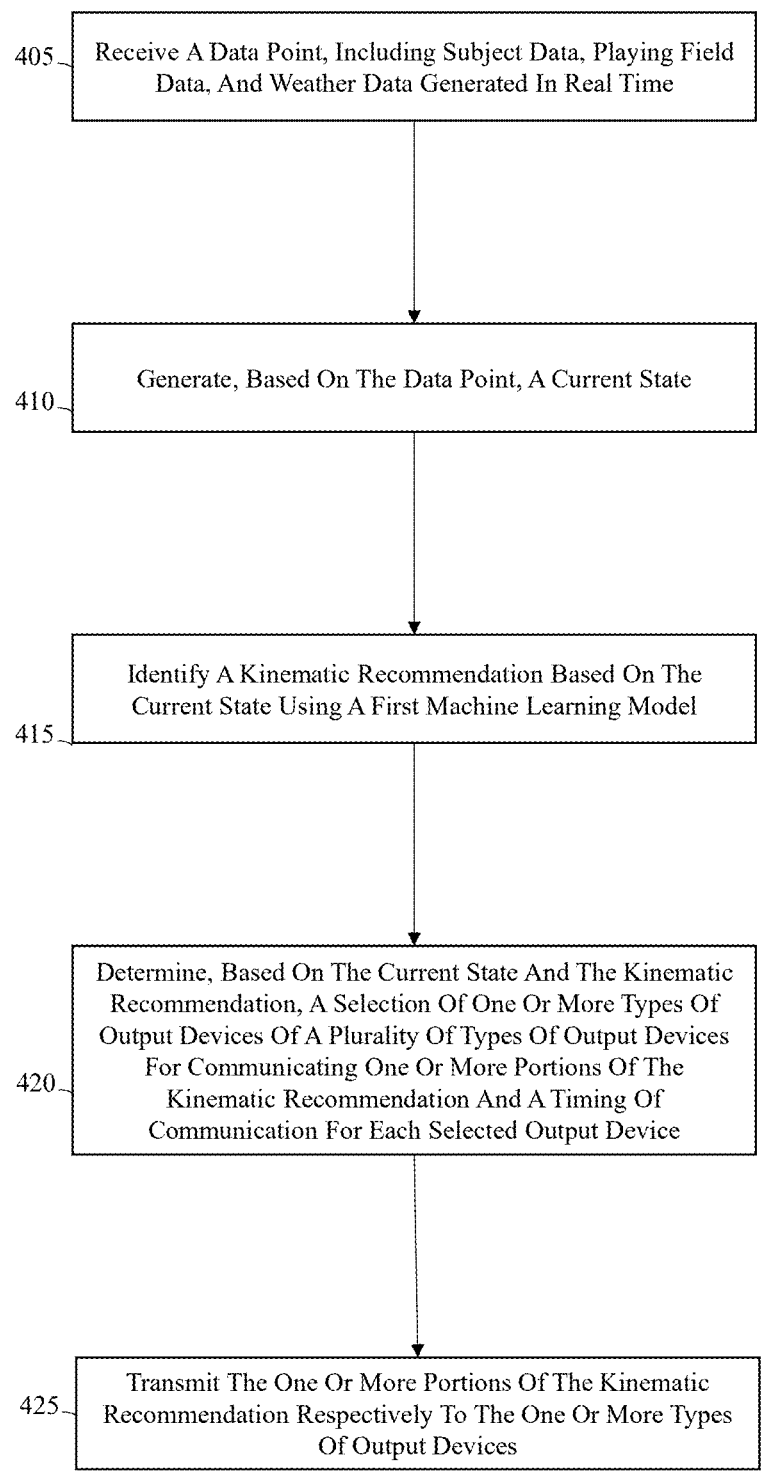
FIG. 4 illustrates an example process performed by a computer application server in accordance with disclosed embodiments.

FIG. 4 illustrates an example process of collecting sensor data and providing subsequent recommendations performed by a kinematic recommendation system in accordance with some embodiments described herein. FIG. 4 is shown in simplified, schematic format for purposes of illustrating a clear example and other embodiments may include more, fewer, or different elements connected in various manners. FIG. 4 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, in step 405 the kinematic recommendation system receives a data point, including subject data, playing field data, and weather data generated in real time. In certain embodiments, the data point includes an integer variable rating a subject stress level. In some embodiments, the data point includes skin conductance data generated in real time.

In step 410 the kinematic recommendation system generates, based on the data point, a current state. In certain embodiments, the current state is a string variable including a written description of the subject stress level.

In some embodiments, the kinematic recommendation system determines a geospatial location of a subject. The kinematic recommendation system retrieves geospatial data based upon the geospatial location, including features of a golf course, the data point including the geospatial data.

In step 415, the kinematic recommendation system identifies a kinematic recommendation based on the current state using a first machine learning model. In certain embodiments, the kinematic recommendation includes a written description of a subject stress level. In some embodiments, the kinematic recommendation system transmitting the current state to the first machine learning model to identify the kinematic recommendation and an additional kinematic recommendation.

In step 420, the kinematic recommendation system determines, based on the current state and the kinematic recommendation, a selection of one or more types of output devices of a plurality of types of output devices for communicating one or more portions of the kinematic recommendation and a timing of communication for each selected output device. In certain embodiments, the kinematic recommendation system determines, based on the current state and a first portion of the one or more portions of the kinematic recommendation, a first message format. In some embodiments, a written description of the subject stress level includes a numerical stress rating, and the determining in step 420 is performed based on the numerical stress rating. In specific embodiments, the determination step comprises using the skin conductance data to determine a maximum number of recommendations to provide via an AR display. In specific embodiments, each message format of a plurality of message formats corresponds to a respective output device of the one or more types of output devices. In some embodiments, the kinematic recommendation system generates via the first machine learning model a prompt including data related to the current state and an instruction to generate golf coaching or guidance related to adjusting a subject's position or kinematic state in natural language and feeding the prompt to a large language model. In specific embodiments, the kinematic recommendation system receives a response from the large language model including the golf coaching or the guidance related to adjusting the subject's position or kinematic state in natural language, and transforms the response via the first machine learning model into quantitative data.

In step 425, the kinematic recommendation system transmits the one or more portions of the kinematic recommendation respectively to the one or more types of output devices. In some embodiments, the kinematic recommendation system transmits the first portion to a first output device of the one or more types of output devices in the first message format. In certain embodiments, the plurality of types of output devices including a specific output device that includes a display screen and implements an augmented reality interface. In certain embodiments, the kinematic recommendation system transmits the kinematic recommendation in a first message format to a first output device of the one or more types of output devices. Based on the current state, the kinematic recommendation system selects a second message format, the second message format different from the first message format. The kinematic recommendation system transmits the additional kinematic recommendation in the selected second message format to a second output device of the one or more types of output devices, the first output device different from the second output device.

In some embodiments, the kinematic recommendation system determines, based on the current state and a second portion of the one or more portions of the kinematic recommendation, a second message format. The kinematic recommendation system transmits the second portion to a second output device of the one or more types of output devices in the second message format, the second message format different from the first message format.

In some embodiments, after transmitting the kinematic recommendation, the kinematic recommendation system collects a resultant data point. The kinematic recommendation system compares the resultant data point to the data point, the current state, the kinematic recommendation, or a combination thereof; to produce a measure of recommendation conformance. In certain embodiments, the kinematic recommendation system stores the recommendation conformance. The kinematic recommendation system collects an additional data point. The kinematic recommendation system, based on the additional data point, prepares an additional current state. The kinematic recommendation system generates an additional kinematic recommendation based on the additional current state and the recommendation conformance using the first machine learning model. In some embodiments, based on the recommendation conformance, the kinematic recommendation system selects an additional message format. The kinematic recommendation system transmits the recommendation conformance to an output device of the one or more output devices in the additional message format.

In certain embodiments, the kinematic recommendation system receives a follow-up query from a follow-up output device of the one or more types of output devices. The kinematic recommendation system transmits a second portion of the one or more portions of the kinematic recommendation to the follow-up output device. In some embodiments, the second portion of one or more portions of the kinematic recommendation is an explainability response directed to explaining the first portion of the one or more portions of the kinematic recommendation.

In some embodiments, the kinematic recommendation system re-trains the first machine learning model based upon the current state. Based on the training, the kinematic recommendation system produces a revised machine learning model. A revised kinematic recommendation, identified by transmitting the current state to the revised machine learning model, is incongruent with the kinematic recommendation.

In some embodiments, the data point is collected by a sensor observing a subject performing a golf-related kinematic action. The kinematic recommendation is transmitted to a message interface readily accessible by the subject.

Additional example processes are recited as follows:

A non-transitory, computer-readable storage medium storing one or more sequences of instructions which when executed cause one or more processor to perform:
  collecting a data point;
  based on the data point, preparing a current state;
  transmitting the current state to a machine learning model to identify a kinematic recommendation;
  based on the current state, selecting a message format from a plurality of message formats; and
  transmitting the kinematic recommendation in the selected message format.

5. Example Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
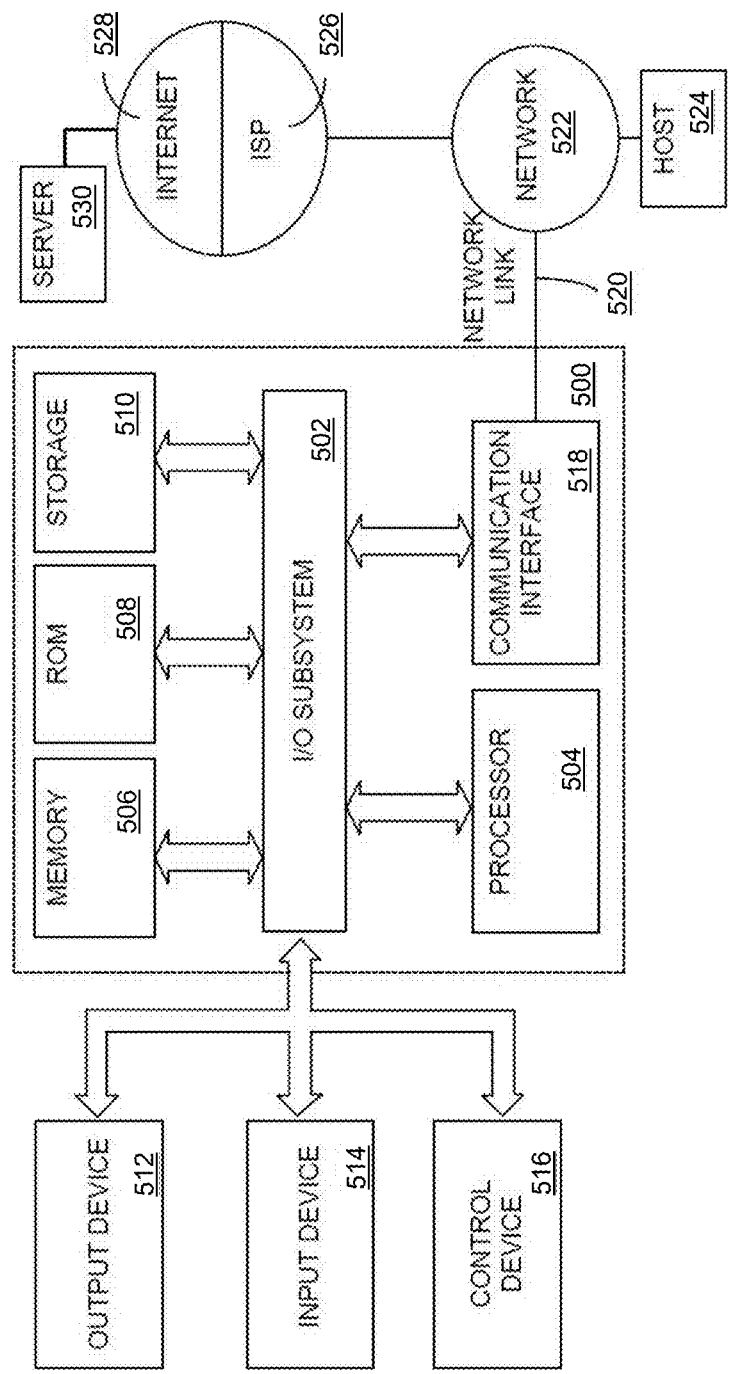
FIG. 5 illustrates a computer system upon which various embodiments may be implemented.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk, or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement Transmission Control Protocol/Internet Protocol (TCP/IP), Hypertext Transfer Protocol (HTTP) or other communication protocols; file processing instructions to interpret and render files coded using HTML, Extensible Markup Language (XML), Joint Photographic Experts Group (JPEG), Moving Picture Experts Group (MPEG) or Portable Network Graphics (PNG); user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators, or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, biometric sensors, pulse sensors, kinematic sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on the output device 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware, and interfaces for generating position reporting packets, notifications, pulse or heartbeat signals, or other recurring data transmissions that specify a position of the computer system 500, alone or in combination with other application-specific data, directed toward host computer 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to I/O subsystem 502. Communication interface 518 provides a two-way data communication coupling to network link(s) 520 that are directly or indirectly connected to at least one communication network, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a LAN, WAN, campus network, internetwork, or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic, or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server 530 may be coupled to internet 528. Server 530 broadly represents any computer, data center, virtual machine, or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, URL strings with parameters in HTTP payloads, application programming interface (API) calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or NoSQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method of preparing kinematic recommendations using artificial intelligence, comprising:
   receiving a data point generated by one or more sensors, including subject data, playing field data, and weather data generated in real time;
   generating, based on the data point, a current state;
   identifying a kinematic recommendation based on the current state using a first machine learning model;
   determining a selection of one or more types of output devices of a plurality of types of output devices for communicating one or more portions of the kinematic recommendation and a timing of communication for each selected type of output device, based on the current state, the kinematic recommendation, and characteristics of the plurality of types of output devices using a second machine learning model,
   the plurality of types of output devices including a first output device that includes a display screen and a second output device that includes a speaker; and
   transmitting the one or more portions of the kinematic recommendation respectively to the one or more types of output devices,
   wherein the method is performed by one or more processors.

2. The method of claim 1, further comprising:
   determining, based on the current state and a first portion of the one or more portions of the kinematic recommendation, a first message format;
   transmitting the first portion to a specific output device of the one or more types of output devices in the first message format;
   determining, based on the current state and a second portion of the one or more portions of the kinematic recommendation, a second message format; and
   transmitting the second portion to a second specific output device of the one or more types of output devices in the second message format, the second message format different from the first message format.

3. The method of claim 1, the first output device implementing an augmented reality interface.

4. The method of claim 1, further comprising:
   re-training the first machine learning model based upon the current state; and
   based on the re-training, producing a revised machine learning model,
   a revised kinematic recommendation identified by transmitting the current state to the revised machine learning model being incongruent with the kinematic recommendation.

5. The method of claim 1, wherein:
   the data point includes an integer variable rating a subject stress level, and
   the current state is a string variable including a written description of the subject stress level.

6. The method of claim 1, wherein:
   the kinematic recommendation includes a written description of a subject stress level,
   the written description of the subject stress level includes a numerical stress rating, and
   the determining is performed based on the numerical stress rating.

7. The method of claim 1, wherein:
   the data point includes skin conductance data generated in real time, and
   the determining comprises using the skin conductance data to determine a maximum number of recommendations to provide via an AR display.

8. The method of claim 1, further comprising:
   determining a geospatial location of a subject; and
   retrieving geospatial data based upon the geospatial location, including features of a golf course,
   the data point including the geospatial data.

9. The method of claim 1, further comprising:
after transmitting the kinematic recommendation, collecting a resultant data point; and
comparing the resultant data point to:
i) the data point,
ii) the current state,
iii) the kinematic recommendation, or
iv) a combination thereof,
to produce a recommendation conformance.

10. The method of claim 9, further comprising:
storing the recommendation conformance;
collecting an additional data point;
based on the additional data point, preparing an additional current state; and
generating an additional kinematic recommendation based on the additional current state and the recommendation conformance using the first machine learning model.

11. The method of claim 9, further comprising:
based on the recommendation conformance, selecting an additional message format; and
transmitting the recommendation conformance to an output devices of the one or more types of output devices in the additional message format.

12. The method of claim 1, wherein:
each message format of a plurality of message formats corresponds to a respective output device of the one or more types of output devices, and
the method further comprises:
transmitting the current state to the first machine learning model to identify the kinematic recommendation and an additional kinematic recommendation;
transmitting the kinematic recommendation in a first message format to a specific output device of the one or more types of output devices;
based on the current state, selecting a second message format, the second message format different from the first message format; and
transmitting the additional kinematic recommendation in the selected second message format to a second specific output device of the one or more types of output devices, the specific output device different from the second specific output device.

13. The method of claim 1, wherein:
a first portion of the one or more portions of the kinematic recommendation is transmitted in a first message format to a specific output device of the one or more types of output devices, and the method further comprises:
receiving a follow-up query from a follow-up output device of the one or more types of output devices; and
transmitting a second portion of the one or more portions of the kinematic recommendation to the follow-up output device.

14. The method of claim 13, wherein the second portion of the one or more portions of the kinematic recommendation is an explainability response directed to explaining the first portion of the one or more portions of the kinematic recommendation.

15. The method of claim 1, wherein the data point is collected by a sensor observing a subject performing a golf-related kinematic action.

16. The method of claim 15, wherein the kinematic recommendation is transmitted to a message interface readily accessible by the subject.

17. The method of claim 1, the identifying comprising:
generating a prompt including data related to the current state and an instruction to generate golf coaching or guidance related to adjusting a subject's position or kinematic state as the kinematic recommendation in natural language; and
feeding the prompt to the first machine learning model being a large language model.

18. The method of claim 17, further comprising:
receiving a response from the first machine learning model including the golf coaching or the guidance related to adjusting the subject's position or kinematic state in natural language; and
transforming the response into quantitative data.

19. A non-transitory, computer-readable storage medium storing one or more sequences of instructions which when executed cause one or more processor to perform:
receiving a data point generated by one or more sensors, including subject data, playing field data, and weather data generated in real time;
generating, based on the data point, a current state;
identifying a kinematic recommendation based on the current state using a first machine learning model;
determining a selection of one or more output devices of a plurality of types of output devices for communicating one or more portions of the kinematic recommendation and a timing of communication for each selected type of output device, based on the current state, the kinematic recommendation, and characteristics of the plurality of types of output devices using a second machine learning model,
the plurality of types of output devices including a first output device that includes a display screen and a second output device that includes a speaker; and
transmitting the one or more portions of the kinematic recommendation respectively to the one or more types of output devices.

20. A system, comprising:
a memory; and
one or more processors coupled to the memory and configured to perform:
receiving a data point generated by one or more sensors, including subject data, playing field data, and weather data generated in real time;
generating, based on the data point, a current state;
identifying a kinematic recommendation based on the current state using a first machine learning model;
determining a selection of one or more output devices of a plurality of types of output devices for communicating one or more portions of the kinematic recommendation and a timing of communication for each selected type of output device, based on the current state, the kinematic recommendation, and characteristics of the plurality of types of output devices using a second machine learning model,
the plurality of types of output devices including a first output device that includes a display screen and a second output device that includes a speaker; and
transmitting the one or more portions of the kinematic recommendation respectively to the one or more types of output devices.

* * * * *